A. F. RIETZEL.
ELECTRIC WELDING MACHINE.
APPLICATION FILED DEC. 24, 1908.
1,001,888.
Patented Aug. 29, 1911.
2 SHEETS—SHEET 2.
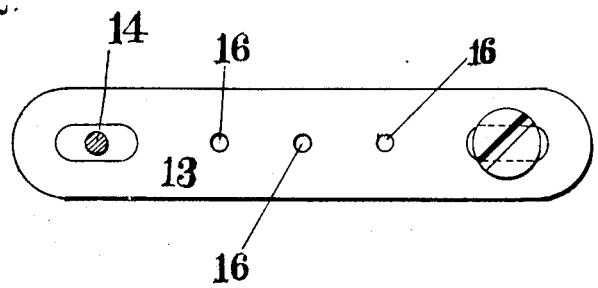
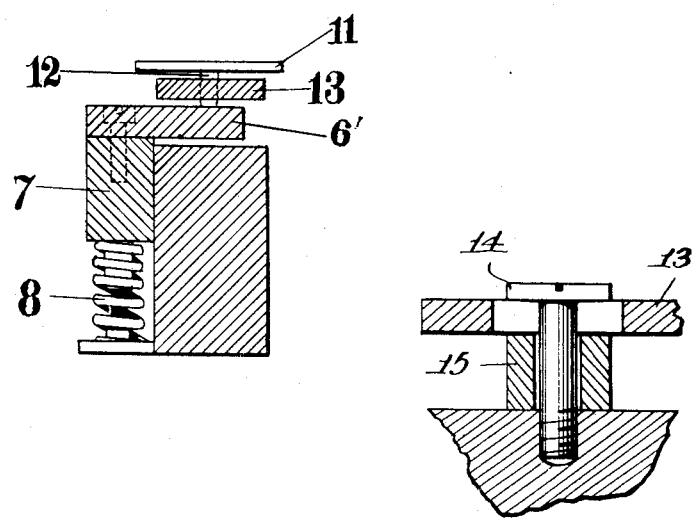
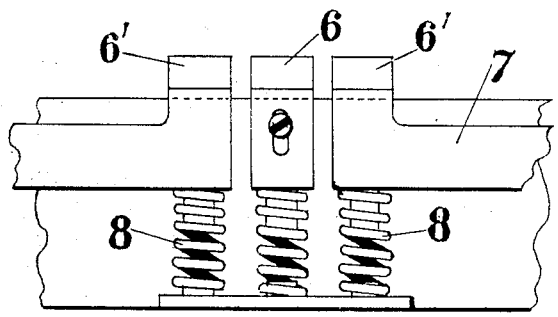
WITNESSES:
INVENTOR
Adolph F. Rietzel.
BY
Townsend Decker
ATTORNEYS

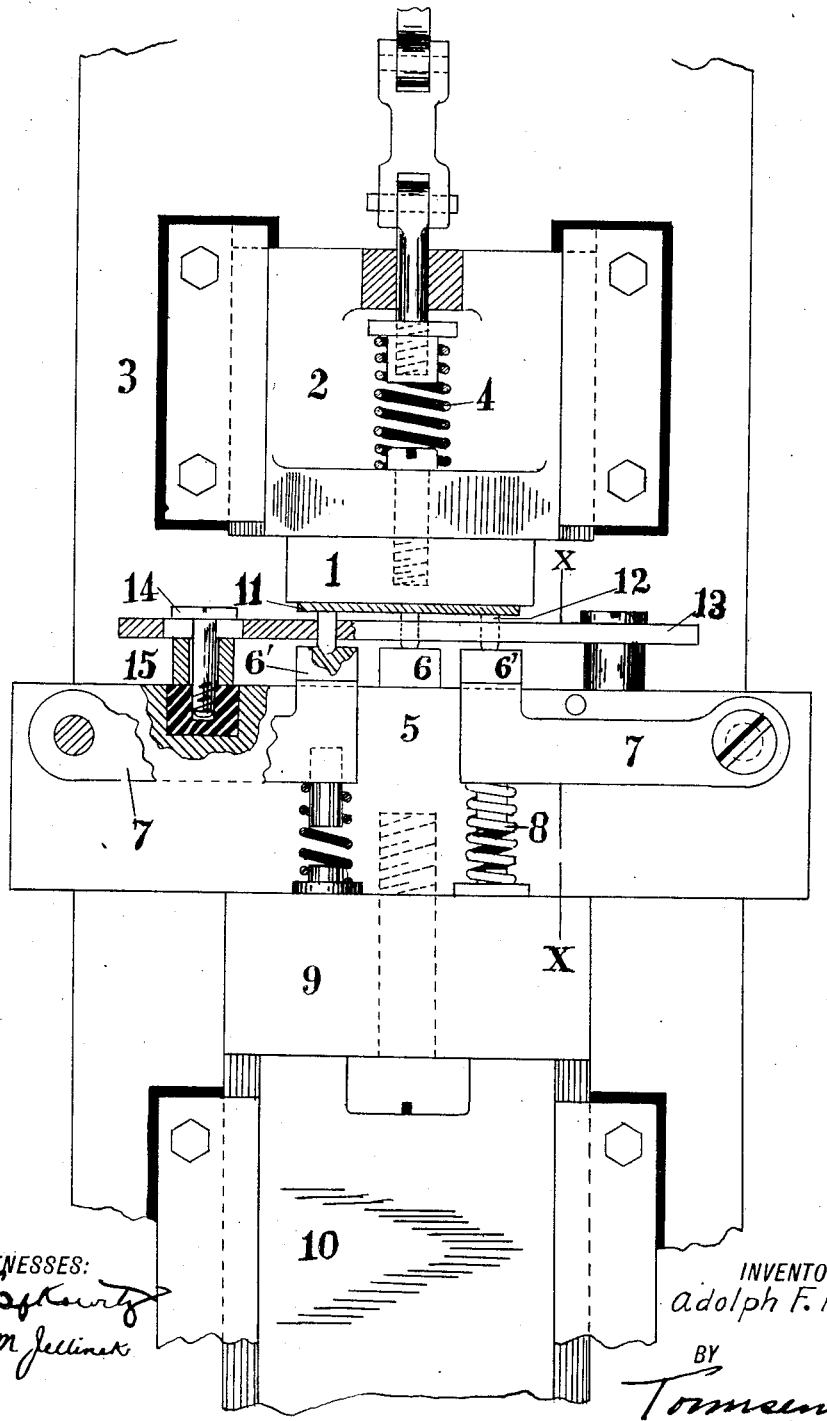

UNITED STATES PATENT OFFICE.

ADOLPH F. RIETZEL, OF CHARLESTOWN, RHODE ISLAND, ASSIGNOR TO UNIVERSAL ELECTRIC WELDING COMPANY, OF NEW YORK, N. Y., A CORPORATION OF NEW YORK.

ELECTRIC WELDING-MACHINE.

1,001,888.  Specification of Letters Patent.  Patented Aug. 29, 1911.

Application filed December 24, 1908.  Serial No. 469,124.

*To all whom it may concern:*

Be it known that I, ADOLPH F. RIETZEL, a citizen of the United States, and a resident of Charlestown, in the State of Rhode Island, post-office address Westerly, Rhode Island, have invented certain new and useful Improvements in Electric Welding-Machines, of which the following is a specification.

My invention relates more particularly to electric welding machines employing a pair of current bearing pressure blocks or heads and means for forcing the same toward one another in order to effect the weld in the electrically heated section of work between them.

One part of my invention relates to an improved construction whereby two or more independent welds may be made at the same time when the pair of heads are forced toward one another. This part of my invention is particularly useful for machines for welding two or more rods or pins to an opposite piece or pieces of metal by a butt weld and by pressure exerted in the direction of the longitudinal axis of said pins or rods.

Another part of my invention relates to means for avoiding the liability of the heated pin or rod to buckle or bend under the application of the end pressure applied thereto while held between said blocks or heads.

To these ends my invention consists in the combinations of parts and details of construction hereinafter described and then specified in the claims.

In the accompanying drawings, Figure 1 is a side elevation of a portion of a welding machine embodying my invention, the parts being shown in section or broken away. Fig. 2 is a plan of a cooling block or plate, one of its fastening screws being shown in cross-section. Fig. 3 is a vertical cross-section through the templet, the current-bearing pressure block and supplemental spring-actuated contact mounted thereon. Fig. 4 is a side elevation of a modification. Fig. 5 shows in side elevation, a modification in the manner of mounting the cooling block or plate.

2 indicates one of the current-bearing pressure blocks of a welding machine, and 1 the removable contact fastened thereto. Said block 2 works in suitable guides 3 and may be the operating head or block which is moved by suitable mechanism toward the opposite head or block to apply pressure to the work assembled between the contact 1 and the contact or contacts upon the opposite current-bearing pressure block. In the present instance it is assumed for purposes of illustration, that the movement of the head or block 2 is produced by mechanism acting thereon through the intervention of a spring 4 and constructed as shown in my prior application, filed November 8, 1906, S. N. 342,456.

5 is the lower or opposite current-bearing pressure block removably secured to a ledge 9 projecting from the lower slide or platen 10 which slides for purposes of adjustment or other-purposes in suitable guides as also described in my prior application before referred to. The current-bearing pressure blocks or heads, however constructed, mounted and guided, are connected with some suitable source of heating current, for instance, with the terminals of a transformer secondary, as shown in my prior application above referred to or in any other suitable manner. Inasmuch as the constructions and features so far described form no part of my present invention they are not illustrated in detail.

6 indicates a central contact upon the head 5 and 6' supplemental contacts removably secured to said head and each provided with a spring 8 to permit them to yield independently of one another and of contact 6 in the direction of the line of welding pressure applied to the work. Each supplemental contact 6' may form the terminal of a lever 7, detachably mounted upon the side face of the head or block 5 and pivoted thereon, as shown, thereby permitting its ready removal and the substitution of other levers of different lengths or having their contact ends differently disposed for different kinds of work. In the present case I have shown the work as comprising a plate 11 and a number of pins 12 to be welded by a butt-weld to the face of said plate. The pins 12 are seated upon the contacts 6 6' and the latter are preferably provided with sockets or cavities in their contact faces which conform to the end of the pins, thus aiding in locating the pins and also serving to prevent tipping of the pin under the endwise pressure. By using the supplemental spring-actuated contacts mounted and pressed, as shown, I provide effectually for any slight disparity in the length of the pins.

In Fig. 1, one of the contacts, namely 6, is supposed to be fixed on the block or head 5. Obviously, however, this contact might be also spring-actuated as indicated in Fig. 4. Suitable stops, as shown, limit the forward movement of the contact.

13 indicates a block or piece of metal by means of which heat may be conducted away from the portions of the pins or pieces 12 back of the welding portion and between such portions and the point on which the pressure is exerted upon said pin or piece in producing the weld. This block or piece 13 is of metal forming a good conductor of heat and is conveniently made of steel. It lies in close contact with the sides of the pins or pieces 12 so as to conduct the heat away and dissipate it in the atmosphere. Obviously, in the case of pins or rods said plate would be simply provided with openings in which the pins or rods fit snugly. Obviously further, the said heat-dissipating plate 13 also operates as a templet to locate the work in the machine. Plate 13 is preferably mounted so as to be insulated from the other parts of the machine through which the current passes to the work. A convenient way of mounting it is to support it directly upon the current-bearing pressure block or head 5, as shown, in which case the screws 14 by which it is fastened enter blocks of insulation set in the head 5.

15 indicates spacing-blocks or washers for supporting the plate 13 at a proper elevation. The fastening screws 14 may pass through elongated slots in the plate to permit longitudinal adjustment of the same when required.

I do not limit myself to any particular manner of supporting this cooling plate or templet 13, nor to supporting it upon any particular part of the apparatus. Preferably, however, it is mounted as shown.

The cooling block or templet 13, in order to best serve its purpose, should be of as large mass and surface as convenient in order that it may absorb the heat of the parts of the piece to be welded forward of the point of application of the pressure by the contacts which engage the work at its rear end or portion. I have shown the said block as so supported on the welding head as to be insulated therefrom but it might be directly connected therewith as shown in Fig. 5 so that a portion of the electric heating current conveyed to the welding point of the pin 12 and plate 11 would pass through said cooling block or plate. In this instance the said block would operate as before to conduct away and dissipate the superfluous heat. As will be readily understood, the ends of the pins 12 where they engage the plate 11 or where the welding is to take place are initially prepared in any desired or proper manner by so pointing or forming them that the current at the beginning of the operation will pass over comparatively limited contact areas and thereby produce a desired welding temperature. This initial preparation being well understood in the art is not shown in the drawings.

What I claim as my invention is:

1. In an electric welding machine a current-bearing pressure block provided with a templet for the work mounted on said block and insulated therefrom.

2. In an electric welding machine, a current-bearing pressure block having a yielding contact, adapted to abut against the piece of metal to be welded and a mass of heat-conducting material engaging the sides of the work and formed as described to act as a templet.

3. In an electric welding machine, a current-bearing pressure block having a yielding contact and carrying a templet of heat-conducting material as and for the purpose described.

4. In an electric welding machine, a current-bearing pressure block abutting against the piece of work to be welded and having a cooling templet engaging the side of the work.

5. In an electric welding apparatus, the combination with means for butt welding a number of rods simultaneously to a common support, of a cooling templet provided with openings in which the rods fit snugly and mounted in position to receive the work.

6. In an electric welding machine for making a number of welds simultaneously, the combination of a pair of opposed current bearing pressure heads or blocks, means for actuating the same to compress the pieces of work between them and two independent work engaging contacts, one of which is yieldingly mounted on its head to yield independently of the other under the pressure applied by said heads to the two pieces of work engaged respectively by said contacts.

7. In an electric welding machine for making independent welds simultaneously, the combination with a pair of opposed current bearing pressure heads and means for actuating the same to compress the pieces of work simultaneously between them, of two or more work engaging contacts engaging respectively different pieces to be welded, each yieldingly mounted upon and deriving current from a head and each adapted to yield independently of the other in the line of the pressure upon the pieces of work.

8. In an electric metal working machine, the combination with a pair of opposed current bearing pressure heads and means for actuating the same to compress the work between them, of a plurality of independently mounted contacts adapted to engage respectively different pieces of work and each yieldingly mounted upon a head and a spring for each contact adapted to hold it yieldingly engaged with its own piece of work during the application of pressure by said pair of opposed heads to the different pieces of work simultaneously.

9. In an electric metal working apparatus, the combination of a pair of current bearing pressure heads adapted to compress the work between them, a plurality of yieldingly mounted contacts common to and mounted on one of said heads and adapted to engage respectively different pieces of work and a spring for each contact, whereby each may yield independently of the others when they receive pressure in common from said heads.

10. In an electric welding machine, the combination of a pair of opposed current bearing heads and means for forcing them together, and a plurality of spring actuated yielding contacts engaging respectively different pieces of the work and mounted so as to receive pressure in common when the heads of said pair approach one another.

11. In an electric welding machine, a current bearing pressure block having a series of independently yielding work engaging spring pressed contacts removably mounted thereon and forming respectively the contacts for different pieces of work and a coöperating current bearing pressure block acting on the pieces of work simultaneously.

Signed at Stonington in the county of New London and State of Conn. this twelfth day of December A. D. 1908.

ADOLPH F. RIETZEL.

Witnesses:
WILLIAM A. WILCOX,
ROUSE L. CLARKE.